(12) United States Patent
Arning et al.

(10) Patent No.: US 7,481,462 B2
(45) Date of Patent: Jan. 27, 2009

(54) FLANGE CONNECTION FOR PIPES

(75) Inventors: Ulrich Arning, Attendorn (DE); Mario Eckel, Lennestadt (DE); Manfred König, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 55 days.

(21) Appl. No.: 11/335,287

(22) Filed: Jan. 19, 2006

(65) Prior Publication Data

US 2006/0170208 A1  Aug. 3, 2006

(30) Foreign Application Priority Data

Feb. 3, 2005  (DE) .................. 20 2005 001 715 U

(51) Int. Cl.
*F16L 41/00* (2006.01)

(52) U.S. Cl. .................. 285/222; 285/56; 285/405; 285/414

(58) Field of Classification Search .................. 285/56, 285/58, 405, 414–415, 222
See application file for complete search history.

(56) References Cited

U.S. PATENT DOCUMENTS

| | | | | |
|---|---|---|---|---|
| 1,291,578 A | * | 1/1919 | McPhail | 285/45 |
| 1,358,714 A | * | 11/1920 | Douglas | 285/10 |
| 1,514,065 A | * | 11/1924 | Leary | 285/58 |
| 2,290,333 A | * | 7/1942 | Johnson | 285/55 |
| 2,912,712 A | | 11/1959 | Shamban et al. | |
| 3,222,093 A | * | 12/1965 | Simmons | 285/149.1 |
| 3,243,206 A | * | 3/1966 | Samer | 285/154.1 |
| 4,770,447 A | * | 9/1988 | Umehara | 285/189 |
| 4,832,377 A | * | 5/1989 | Umehara | 285/222 |
| 6,494,503 B1 | | 12/2002 | Heubach et al. | |
| 6,634,034 B2 | * | 10/2003 | Rendell | 4/252.4 |
| 6,805,385 B2 | | 10/2004 | Viegener | |

FOREIGN PATENT DOCUMENTS

| | | |
|---|---|---|
| DE | 24273 | 10/1883 |
| DE | 7 426 315 U | 5/1975 |
| DE | 297 21 760 U1 | 3/1998 |
| FR | 1574996 | 7/1969 |
| FR | 2649469 | 1/1991 |
| GB | 1317758 | 5/1973 |
| JP | 05-2 80675 A | 10/1993 |
| JP | 2000-0 18 957 A | 1/2000 |
| WO | WO 98/06966 | 2/1998 |

* cited by examiner

*Primary Examiner*—Aaron M Dunwoody
*Assistant Examiner*—Fannie Kee
(74) *Attorney, Agent, or Firm*—Barnes & Thornburg LLP

(57) ABSTRACT

A flange connection for pipes, especially for sanitary installations. The flange connection comprises a connecting piece which can be joined at each end to a pipe to produce a sealed connection. The flange connection further comprises a flange which is arranged radially outside on the connecting piece and which is fixable to a further component to make an indirect connection between the connecting piece and the further component. The flange has an opening through which the connecting piece is guided and the flange is fixed on the connecting piece by a retaining element.

9 Claims, 4 Drawing Sheets

FLANGE CONNECTION FOR PIPES

The present invention relates to a flange connection for pipes, especially for sanitary installations, comprising a connecting piece which can be joined at each end to a pipe to produce a sealed connection and comprising a flange which is arranged radially outside on the connecting piece and which is fixable to a further component by means of fixing means to make a connection between the connecting piece and the further component.

Known from WO 98/06966 is a flange connection for pipes wherein one pipe end can be inserted in a sleeve on one side and a flange connection is provided on the opposing side. The sleeve has a bordered end section to which a disk-shaped flange can be applied. However, the flange is loosely constructed and must be pushed onto the sleeve during assembly. This is disadvantageous because a plurality of individual components must be provided on site so that the flange connection can then be assembled therefrom.

Further, it is known for sanitary installations to connect pipes by means of a press connection using fittings or armatures. However, in the case of larger diameters it can arise that press connections are no longer provided for connections but flange connections, for example for the connection of armatures. In these flange connections the radial flange projecting from a cylindrical connecting piece can be made of solid material which, however, is responsible for high manufacturing costs because of the necessary raw material and the subsequent machining steps.

It is thus the object of the present invention to provide a flange connection for pipes which is simple to assemble and inexpensive to manufacture.

According to the invention, the flange has an opening through which the connecting piece is guided, the flange being fixed on the connecting piece by means of retaining means. As a result of this mechanical fixing of the flange, a ready-to-assemble unit is provided which can be connected as a flange connection to pipes, armatures, fittings and the like. In this case, the flange connection can be manufactured cheaply since flange and connecting piece can be produced separately so that no expensive manufacturing methods need to be used. Furthermore, an inexpensive material can be used for the flange since this does not come in contact with the medium as a result of the bordered connecting piece.

According to a preferred embodiment of the invention, the connecting piece is bordered at the end and a radially projecting section abuts against the flange. As a result, the flange can thereby be fixed on this side by the projecting section in the axial direction. The flange is preferably fixed in the axial direction on the other side by the retaining means so that the flange is undetachably held on the connecting piece.

The flange can be locatable on the retaining means for simple manufacture of the ready-to-assemble flange connection. Then the flange only needs to be pushed onto the retaining means and is then held there. In this case, the retaining means can form a ring on which radially protruding locating lugs are formed which secure the flange against axial displacement or against tilting at a plurality of points.

According to a further embodiment of the invention, the retaining means embraces the connecting piece and forms an outer surface on which the flange is positioned. The retaining means thereby takes over also the function of centering the flange which, for example, must be arranged concentrically to the axis of the connecting piece.

The retaining means is preferably formed of at least two segments which are inserted between flange and connecting piece. In this case, the retaining means can be fixed axially between an end section projecting radially on the connecting piece and an expansion at the connecting piece so that the individual segments are inserted in the corresponding receptacle and the flange is then pushed on and thus the retaining means and the flange are axially secured. The individual segments of the retaining means cannot be moved in the radial direction by the surrounding flange.

According to a further embodiment of the invention, the flange connection comprises a connecting piece of a cold-deformable material which can be connected to an insertable pipe end by means of a press connection on the opposite side to the flange. It is naturally possible to provide the flange connection on both sides of the connecting piece, that is to mount a flange at each end. However, a press connection is preferably arranged on the opposite side, since it is quick to assemble and can be composed using an existing installation system. For making a press connection an inner receptacle can be formed at the connecting piece on the side opposite to the flange, in which a cutting ring and/or a sealing ring are retained. In this case, the connecting piece can be made cheaply of a cold-deformable material such as copper or steel.

In order to also provide a sufficiently stable flange connection in the long term, the flange preferably consists of a disk of metal, for example of steel, so that correspondingly high tensile forces can be absorbed. The retaining means on the other hand can be made inexpensively of plastic, since these are only used for pre-fixing.

The invention is explained in detail hereinafter using an exemplary embodiment with reference to the appended drawings. In the figures.

Figure 1:
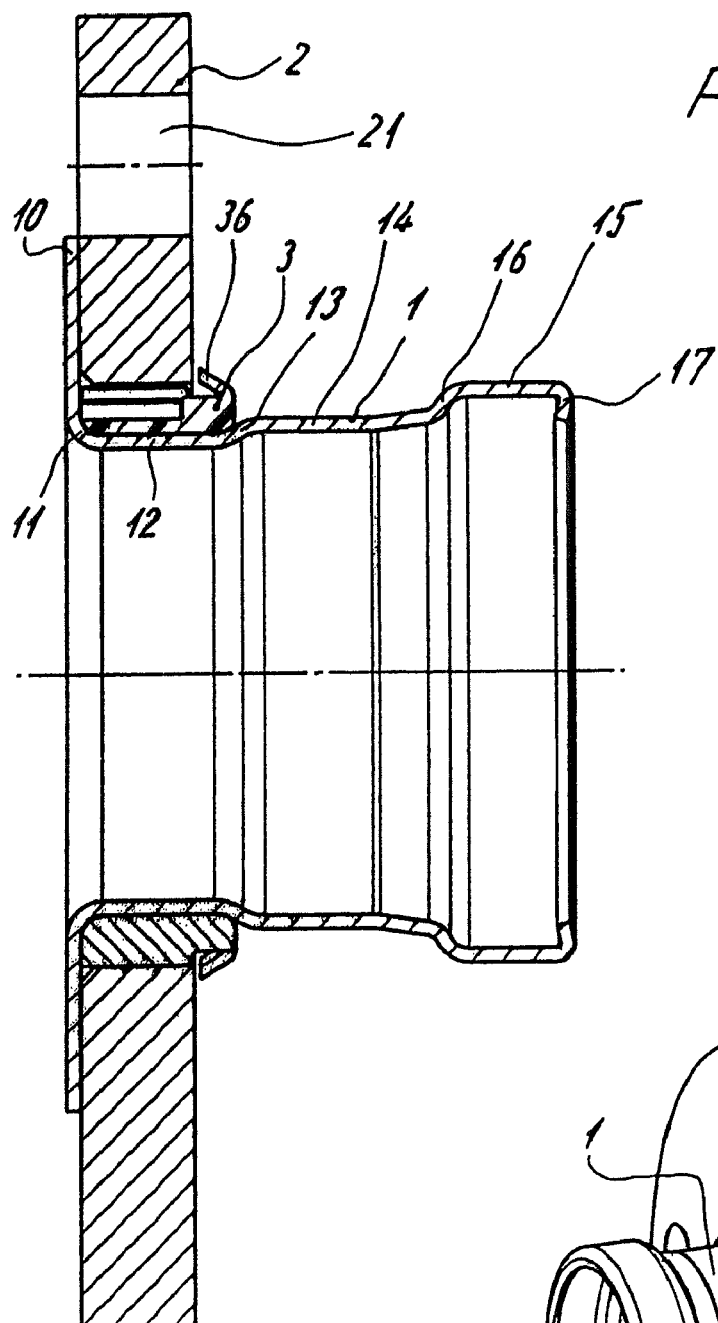
FIG. 1 is a cutaway side view through an exemplary embodiment of a flange connection according to the invention.
Figure 2:
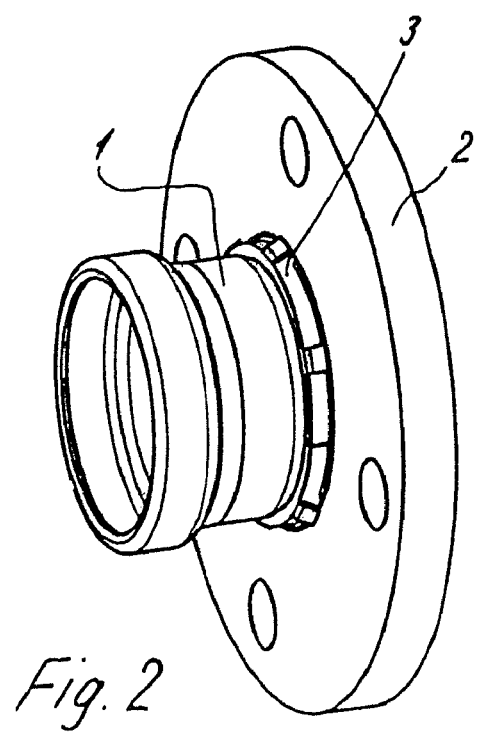
FIG. 2 is a perspective view of the flange connection from FIG. 1.

A flange connection comprises a connecting piece 1 of metal, for example copper, steel or another material that can be deformed by cold forming. The connecting piece 1 is provided with a flange 2 at the end on one side which is fixed by retaining means 3 on the connecting piece 1 in the axial direction. The flange 2 abuts at the end against an annular radially projecting section 10 of the connecting piece 1 which is produced by bordering and goes over from a curve 11 into a cylindrical section 12. Retaining means 3 are disposed around the cylindrical section 12 which comprise projecting locating lugs 36 which fix the flange 2 optionally with some play. In this case, the retaining means 3 are fixed in the axial direction and abut in a central area of the connecting piece 1 against an expansion 13. Adjacent to the expansion 13 is a cylindrical section 14 which opens in an end section for a press connection.

The press connection on the side opposite to the flange 2 comprises a receptacle 15 into which a sealing ring and/or a cutting ring are insertable. The receptacle 15 is bounded on both sides by radially inwardly directed sections 16 and 17 so that sealing ring and/or cutting ring are held undetachably in the receptacle 15. It is also possible to arrange a plurality of receptacles 15 adjacent to one another to arrange cutting ring and sealing ring separately from one another, as is shown for example in DE 297 21 760. Furthermore, it is naturally possible to provide another flange connection, a threaded connection or other connection on the side of the receptacle 15.

Figure 3:
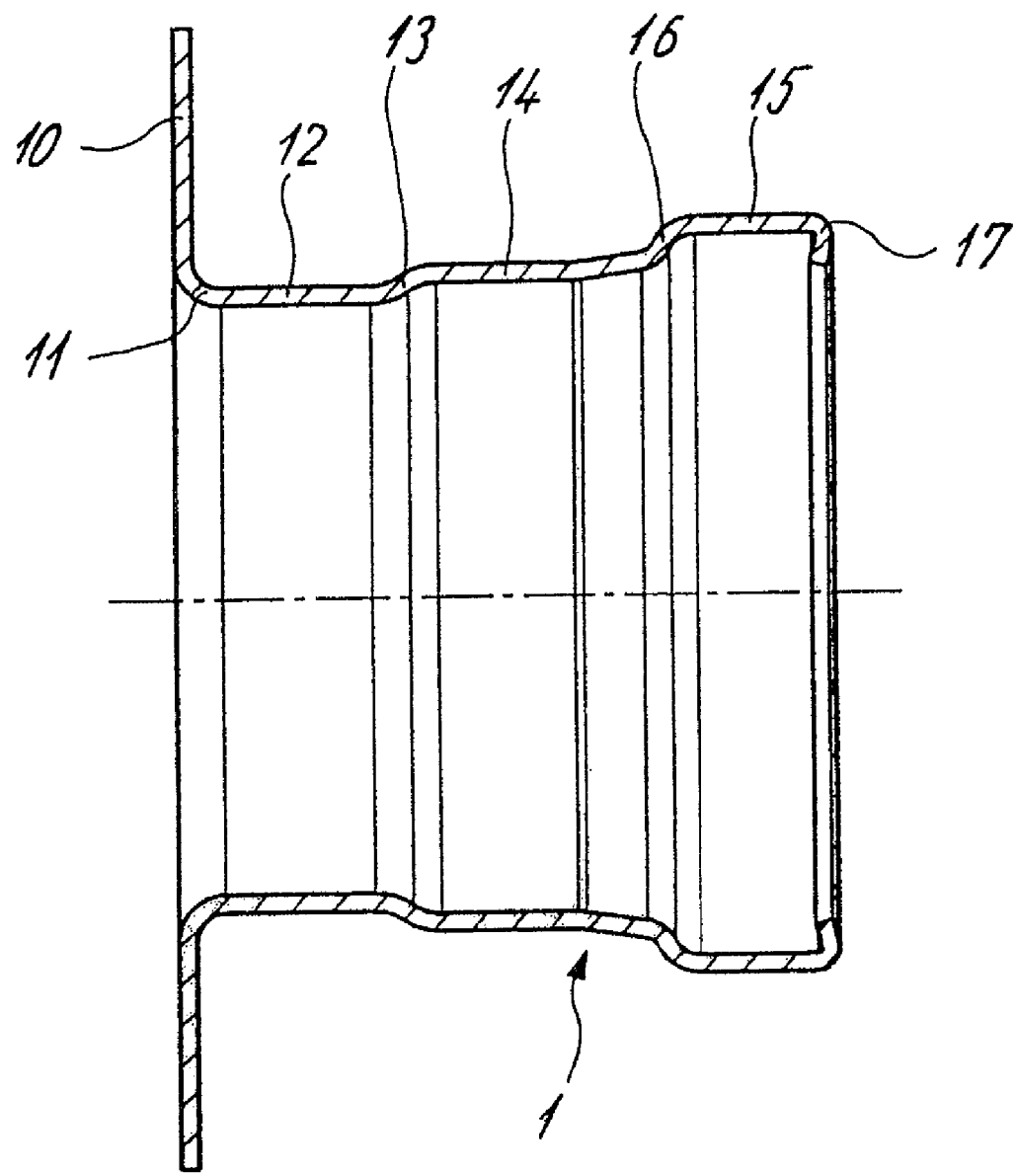
FIG. 3 is a cutaway side view of the connecting piece of the flange connection from FIG. 1.

As is shown in FIG. 3, the connecting piece 1 was formed integrally from one material, wherein the radially projecting section 10 and the other sections were formed by material forming. To produce a ready-to-assemble flange connection, merely the retaining means 3 and the flange 2 are then mounted and optionally also sealing ring and/or cutting ring are inserted in the receptacle 15.

Figure 4:
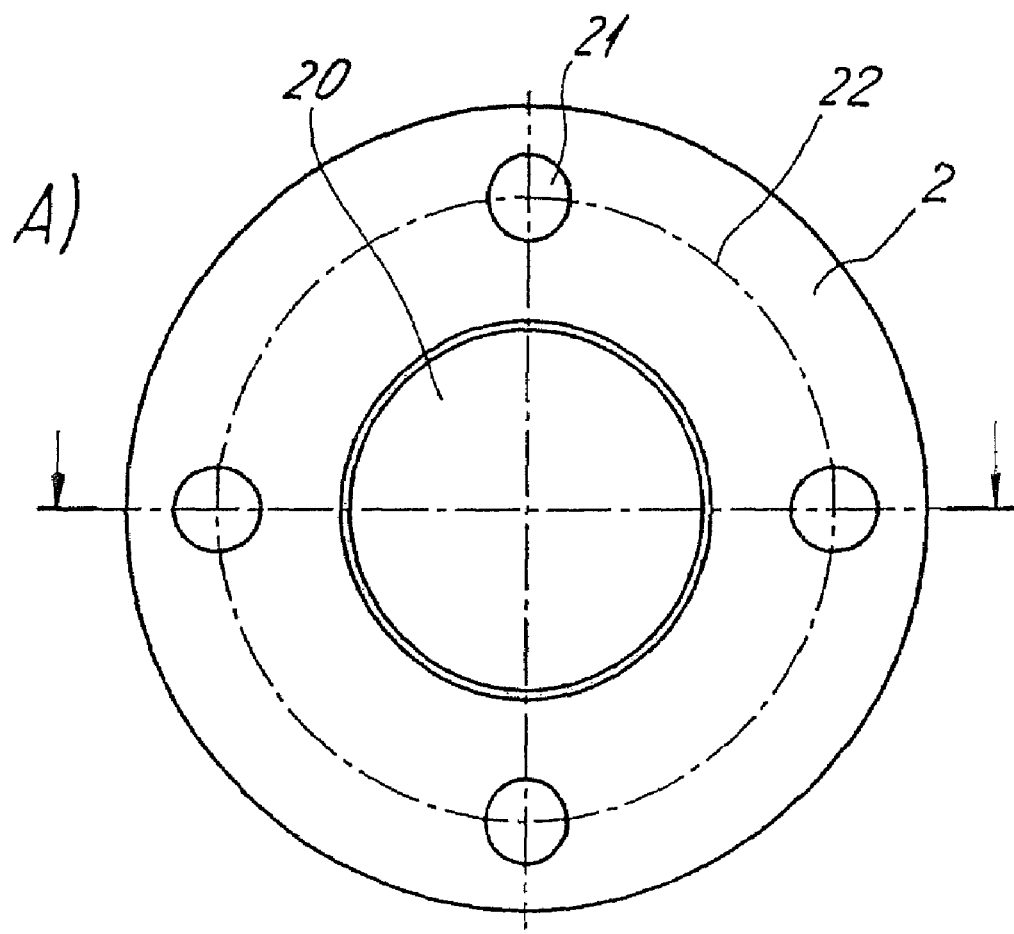
FIGS. 4A and 4B are two views of the flange from the flange connection from FIG. 1, and FIGS. 5A to 5C are several views of a retaining means of the flange connection from FIG. 1.
Figure 4:
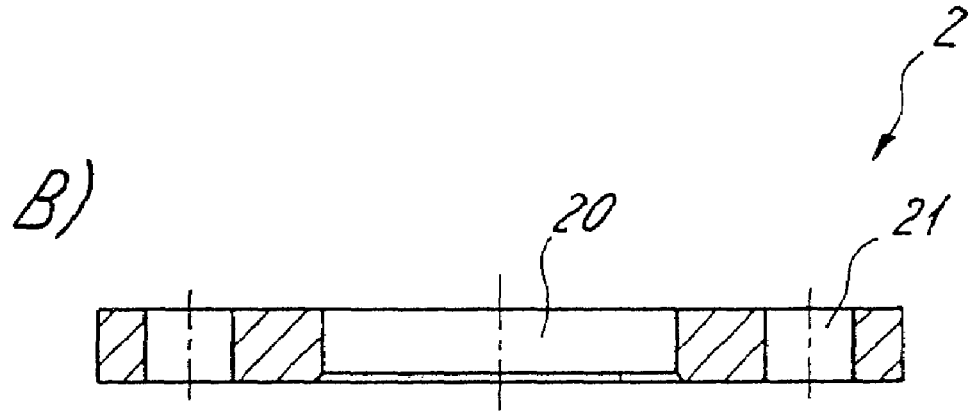

The flange 2 which consists of metal, preferably steel, is shown in detail in FIGS. 4A and 4B. The flange 2 has a central opening 20 through which the connecting piece 1 is guided. In the area of the opening 20 there is a spacing between the cylindrical section 12 and the flange 2 in which the retaining means 3 are arranged. The flange 2 further has a plurality of openings 21 which are arranged on a pitch circle diameter 22 which is dimensioned so that the radially projecting section 10 protrudes at most as far as the openings 21 but does not cover these. The flange 2 can be connected to a further component such as a armature by means of known fixing means such as screws and nuts, wherein sealing means can be mounted on the radially projecting section 10.

Figure 5:
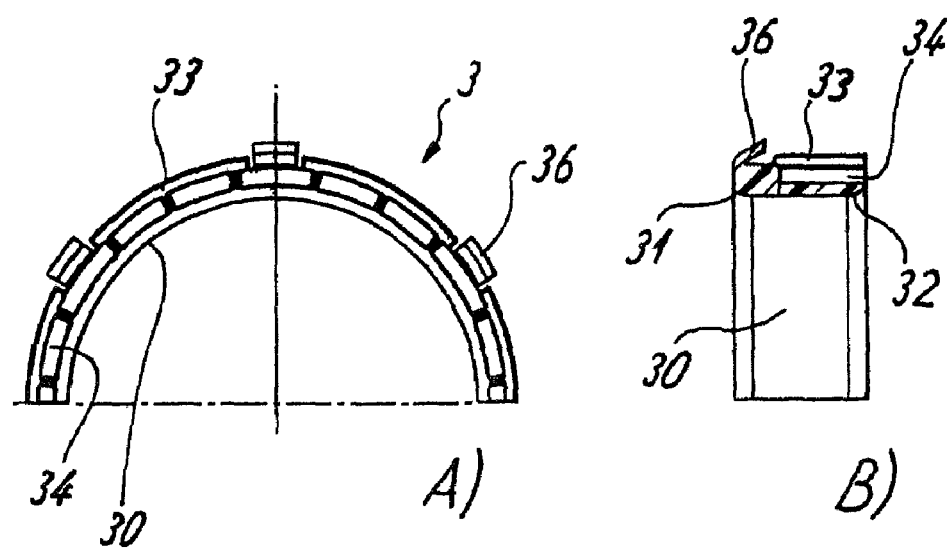
Figure 5:
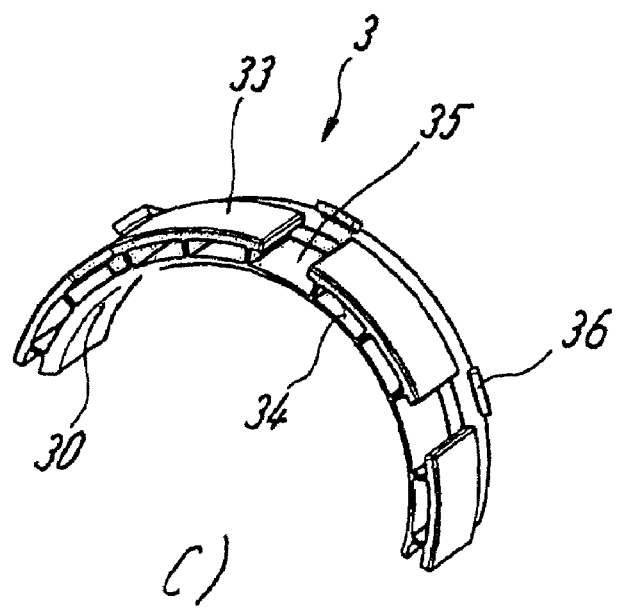

FIGS. 5A to 5C show a part of the two retaining means 3, each formed by a ring segment of plastic material. The retaining means 3 have an inner circumferential surface 30 which can abut against the cylindrical section 12. The inner circumferential surface is expanded at the end, one edge 32 abutting against the curvature 11 whereas the opposite edge 31 abuts against the expansion 13 so that the retaining means 3 are received in the axial direction on the connecting piece 1 by form closure.

The retaining means 3 further have an outer circumferential surface 33 onto which the flange 2 can be pushed with the opening 20. In this case, the outer circumferential surface 33 has approximately the same diameter as the outer surface of the receptacle 15. Hollow chambers 34 are constructed between the inner circumferential surface 30 and the outer circumferential surface 33 so that the retaining means 3 form a spacer for the flange 2 and center it with respect to the connecting piece 1. The outer circumferential surface 33 is interrupted at points 35 at which locating lugs 36 are provided. The locating lugs 36 are moulded on an axial end of the retaining means 3 and project radially over the outer circumferential surface 33 so that the flange 2 can be pushed over the locating lugs 36 so that these are then radially inwardly deformed and are moved backwards in the radial direction after release so that a front edge of the locating lugs 36 secures the flange 2 in the axial direction.

For assembly of the flange connection the two ring segments are inserted in the cylindrical section 12 and the flange 2 is then snapped on with the opening 20. Thereafter the flange 2 can no longer be withdrawn in the axial direction and the retaining means 3 can no longer be moved outwards in the radial direction as ring segments, since this is prevented by the flange 2. For demounting the locating lugs 36 must thus all be pressed inwards in order to first take off the flange 2 again and then remove the retaining means 3.

In the exemplary embodiment shown the retaining means 3 are formed by two segments which can be placed around the connecting piece 1. It is naturally also possible to arrange a plurality of segments around the connecting piece 1 and then secure by the flange 2. Furthermore, the individual segments can be interconnected by means of a joint, for example, by means of a film hinge formed by a weakening of the material.

In addition, the retaining means need not extend around the complete circumference of the connecting piece 1 but it can be sufficient to snap a retaining means elastically over the connecting piece, wherein the segment shown in FIGS. 5A to 5C could enclose an angle of for example 230 to 360° C. of the connecting piece 1 so as to still ensure centering of the flange 2.

Instead of engaging the flange 2 by means of the retaining means 3, a clamping fixing of the flange 2 can also be made. For example, wedge-shaped expanding segments can be provided between the cylindrical section 12 and the opening 20 which then provide a fixing of the flange 2.

The invention claimed is:

1. A flange connection for pipes, useful in sanitary installations, comprising:
   a connecting piece configured to be joined at each end to a pipe to produce a sealed connection, the connecting piece including an end section that projects radially and further includes an expansion;
   a flange arranged radially outside and abutting the radially projecting end section of the connecting piece configured to be fixable to a further component to form an indirect connection between the connecting piece and the further component, the flange including an opening and the connecting piece being guided therethrough;
   a retaining element including at least two segments;
   wherein the at least two segments of the retaining element are located between the flange and the connecting piece and the flange is fixed on the connecting piece by the retaining element;
   wherein the retaining element is axially fixed between the end section and the expansion; and
   wherein the retaining element includes a ring on which radially projecting locating lugs are formed.

2. The flange connection according to claim 1, wherein the radially projecting end section is formed by bending an end of the connecting piece and wherein the radially projecting end section abuts against the flange and the retaining element.

3. The flange connection according to claim 2, wherein the flange is fixed in an axial direction between the radially projecting end section and the retaining element.

4. The flange connection according to claim 1, wherein the flange is configured to be latched onto the retaining element.

5. The flange connection according to claim 1, wherein the retaining element abuts the connecting piece and includes an outer surface on which the flange is positioned.

6. The flange connection according to claim 1, wherein the connecting piece is formed of a cold-deformable material and is configured to be connected to an insertable pipe end on a side opposite to the flange by a press connection.

7. The flange connection according to claim 6, wherein, on the side opposite to the flange, an inner receptacle is formed on the connecting piece in which one of a cutting ring and a sealing ring can be retained.

8. The flange connection according to claim 1, wherein the flange is formed from a metal disk.

9. The flange connection according to claim 1, wherein the retaining element is made from plastic.

* * * * *